Patented July 25, 1933

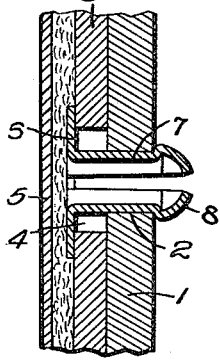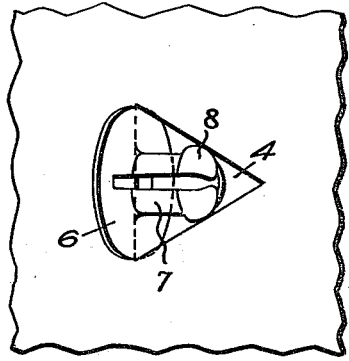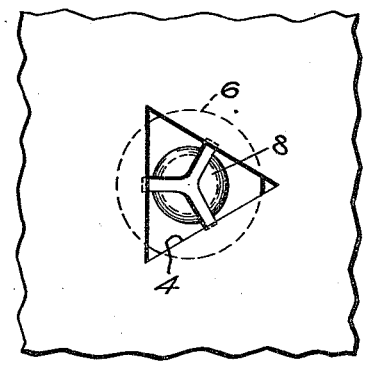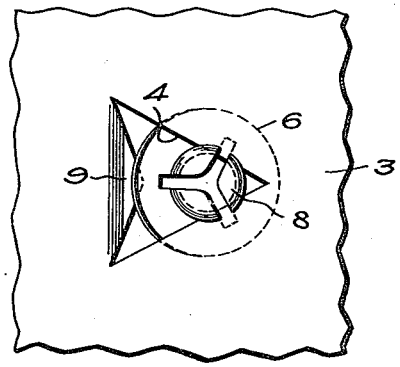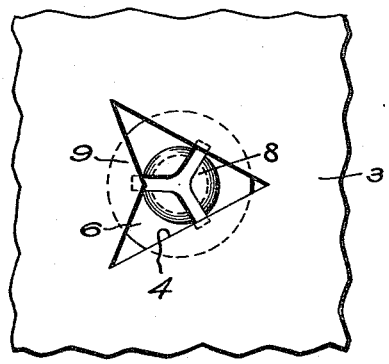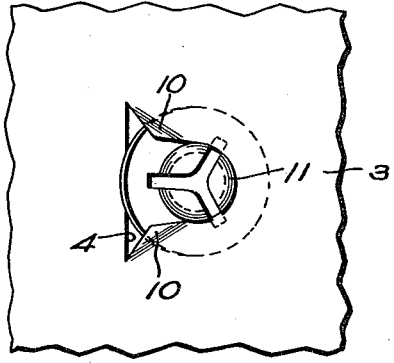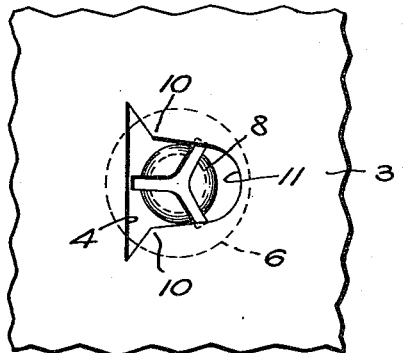

1,919,951

UNITED STATES PATENT OFFICE

ARTHUR W. KIMBELL, OF NEWTON CENTER, MASSACHUSETTS, ASSIGNOR TO UNITED-CARR FASTENER CORPORATION, OF CAMBRIDGE, MASSACHUSETTS, A CORPORATION OF MASSACHUSETTS

SNAP FASTENER INSTALLATION

Application filed June 5, 1930. Serial No. 459,314.

My invention aims to provide improvements in snap fastener installations.

In the drawing which illustrates preferred embodiments of my invention:—

Figure 1 is a section through a snap fastener secured installation showing the clearance to permit shifting of the fastener;

Fig. 2 is an elevation view of a portion of the stud-carrying structure and shows the stud as it is being assembled therewith;

Fig. 3 is a view of the parts shown in Fig. 2 as the stud appears when assembled with the fastener-carrying structure;

Fig. 4 is an elevation view of a modified form of fastener-carrying structure showing the stud in the act of being engaged therewith;

Fig. 5 is a view of the parts shown in Fig. 4 after the stud has been completely assembled;

Fig. 6 is an elevation view of another modified form of fastener-carrying structure and the stud is shown in the act of being attached; and Fig. 7 is a view of the parts shown in Fig. 6 after the stud has been attached.

Referring to the particular embodiments of my invention selected for illustration by the drawing, I have shown fastener installations particularly, though not exclusively, useful in connection with upholstery work for vehicle bodies and the like. My invention is particularly applicable in connection with securing panels of upholstery in place and is directed to the fastener-supporting structure and the apertures therein whereby the fasteners may be attached to the structure after it has been completed and before the panel is to be attached to the framework.

Referring now to Figs. 1, 2 and 3, I have shown (Fig. 1) a frame piece 1 having an aperture 2 to which is secured a panel having a substantially rigid part 3 provided with a triangular shaped aperture 4 and covered at one side by flexible material 5. The fastener members which are attached to the panel are in the form of stud members each of which has a base 6, a relatively long neck 7 and a head 8.

By using a triangular shaped aperture I provide a continuous wall around the aperture 4 so that when the base is inserted through the aperture, by tipping it (Fig. 2) and pressing it through until the base lies between the part 3 and the covering material 5 (Figs. 1 and 3), it will bear against a strong surface adjacent to the aperture. Axial stresses cannot pull the part 3 from the stud when the fastener-supporting structure is attached to the frame 1, because the base 6 extends over substantial portions of the part 3, as shown in Fig. 3. The triangular aperture serves a double purpose inasmuch as it permits passage of the base of the stud and is sufficiently larger than the diameter of the neck 7 of the stud to permit lateral shifting thereof for alignment with the aperture 2 in the frame part 1.

In Figs. 4 and 5 I have shown a portion of a fastener-supporting structure and a stud member substantially the same as that shown in Figs. 1 to 3, except that an additional feature is present which makes it more difficult to remove the fastener once it is in place. The particular means for preventing accidental removal of the stud is in the form of a triangular shaped extension 9 intersecting the aperture 4 at one side. This extension 9 is preferably an integral portion of the part 3 which is made of cardboard or the like and therefore is adapted to flex. The dimensions of the aperture are such (Fig. 4) that the stud base 6 cannot be entirely entered through the aperture without flexing the extension 9 by pressing downwardly to permit the base to snap by. The extension does not interfere with the shifting of the stud.

In Figs. 6 and 7 I have shown another modified form of stud installation. This form includes the means for preventing accidental removal of the stud, as shown in Figs. 4 and 5, except that in this case two flexible extensions 10—10 are provided one at each of two edges of the triangular shaped aperture 4. These projections act in a slightly different manner from the one shown in Figs. 4 and 5, because they are adapted to yield upwardly to permit entrance of the base 6 through the aperture, as shown in Fig. 6.

To illustrate the fact that the aperture 4 may be triangular shaped without being in the exact form of a triangle, I have shown in Figs. 6 and 7 a rounded portion 11 at the side opposite the side the base is entered. By rounding the end, the size in area of the aperture 4 is somewhat reduced and even with the projections 10—10 the stud may be readily attached and when attached may shift laterally, as shown by the relation of the neck (shown in dotted lines in Fig. 7) to the wall surrounding the aperture 4.

With the type of construction shown in Figs. 4 and 5 there is a larger cooperative bearing surface between the base 6 of the stud and the part 3 and in the construction shown in Figs. 6 and 7 this bearing surface is even greater than in the construction shown in Figs. 4 and 5.

In the drawing like parts in all constructions are provided with like numerals.

While I have illustrated and described preferred embodiments of my invention, I do not wish to be limited thereby, because the scope of my invention is best defined by the following claims.

I claim:

1. An upholstery installation comprising, in combination, a fastener-carrying structure including a cardboard part having a substantially triangular-shaped aperture therethrough, a covering material applied to one side of said cardboard part to conceal said aperture, a snap fastener member carried by said fastener-carrying structure and having a base proportioned to overhang and engage the cardboard part adjacent to each side of the aperture therethrough to maintain assembly and being located between the cardboard part and the covering material and a neck of smaller diameter than the aperture extending therethrough for engagement with cooperating fastening means, said aperture being large enough adjacent to at least one side thereby to permit passage of the base of the fastener member for attachment and detachment thereof when held at an angle to the cardboard.

2. An upholstery installation comprising, in combination, a fastener-carrying structure including a cardboard part having a substantially triangular-shaped aperture therethrough, a covering material applied to one side of said cardboard part to conceal said aperture, a snap fastener member carried by said fastener-carrying structure and having a base proportioned to overhang and engage the cardboard part adjacent to each side of the aperture therethrough to maintain assembly and being located between the cardboard part and the covering material and a neck of smaller diameter than the aperture extending therethrough for engagement with cooperating fastening means, said aperture being large enough adjacent to at least one side thereby to permit passage of the base of the fastener member for attachment and detachment thereof and a yieldable portion of the cardboard intersecting said aperture at one side thereof to prevent accidental separation of the fastener member from the fastener-carrying structure but being yieldable to permit passage of the base of the fastener through the aperture when such action is intended.

3. An upholstery installation comprising, in combination, a fastener-carrying structure including a cardboard part having a substantially triangular-shaped aperture therethrough, a covering material applied to one side of said cardboard part to conceal said aperture, a snap fastener member carried by said fastener-carrying structure and having a base proportioned to overhang and engage the cardboard part adjacent to each side of the aperture therethrough to maintain assembly and being located between the cardboard part and the covering material, a neck of smaller diameter than the aperture extending therethrough for engagement with cooperating fastening means, said aperture being large enough adjacent to at least one side thereby to permit passage of the base of the fastener member for attachment and detachment thereof and a yieldable projection of said cardboard at each of the other sides of the aperture to prevent accidental separation of the fastener member from the fastener-carrying structure but yieldable to permit passage of the base of the fastener through the aperture when being engaged with or disengaged from said fastener-carrying structure.

4. An upholstery installation comprising, in combination, a fastener-carrying structure including a cardboard part having an aperture therethrough, a covering material applied to one side of said cardboard part to conceal said aperture, a snap fastener member carried by said fastener-carrying structure and having a base proportioned to overhang and engage the cardboard part adjacent to each side of the aperture therethrough to maintain assembly and being located between the cardboard part and the covering material, a neck of smaller diameter than the aperture extending therethrough for engagement with cooperating fastening means and a flexible projection of said cardboard part intersecting said aperture at one side thereof, said aperture being shaped to permit passage of the base of the fastener member by predetermined tipping manipulation thereof and said flexible projection providing means which yields to permit completion of the insertion of the base through the aperture and which acts to prevent accidental disengagement of the fastener member from the fastener-carrying structure.

ARTHUR W. KIMBELL.